Figure 1:
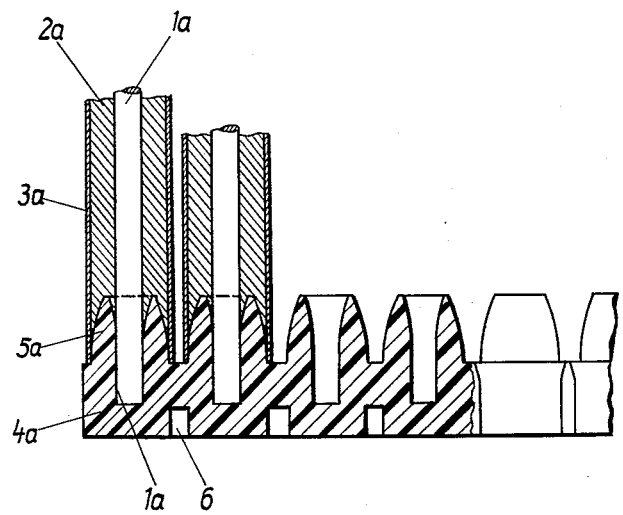

INVENTORS
HERBERT GUMPRECHT AND
WERNER WEISSELBERG

By Erich M. H. Radde
Agent

United States Patent Office 3,014,975
Patented Dec. 26, 1961

3,014,975
POSITIVE PLATE FOR LEAD-ACID BATTERIES AND METHOD FOR ITS MANUFACTURE
Herbert Gumprecht, Vollmarstein (Ruhr), and Werner Weisselberg, Hagen, Westphalia, Germany, assignors to Accumulatoren-Fabrik Aktiengesellschaft, Hagen, Westphalia, Germany, a corporation of Germany
Filed Jan. 21, 1960, Ser. No. 3,902
2 Claims. (Cl. 136—43)

The present invention relates to positive plates for storage batteries with an acidic electrolyte, which plates have vertical tubes within which the active material is contained.

Conventionally, the grid of such plates consists of a number of vertical lead spines cast integrally with the top bar. At the bottom, the spines may be burned to a lead bar after the tubes are filled with a lead oxide active material or the spines may be press-fit with their ends into a molded rubber or plastic bar.

Whether of lead, rubber or plastic, such bottom bars have been made with rows of annular extensions with beveled rims. The filled tubes are then press-fit over these extensions, with the spines extending into the central recesses defined by the annular extensions whereby the tubes are closed.

The conventional extensions are relatively short and have the considerable disadvantage that, since the active material shrinks when the plate is immersed into the sulfuric acid electrolyte before formation in the tubes, a cavity is formed between the extension and the active material in each tube whereby the spine is laid open to the corrosive attack of the sulfuric acid, which is particularly severe in the presence of e'ectric current during the operation of the battery. An additional disadvantage resides in the difficulty often encountered in fitting the tubes over the short stubs of the bottom bar.

It is an object of the present invention to overcome these disadvantages and to produce an improved positive plate for acid storage batteries.

This object is accomplished in accordance with the present invention by a change in the structure of the bottom bar of the plate. According to this invention, the annular stubs on the bottom bar, which close off the vertical tubes of the plate, have a conical cross section of sufficient height to substantially extend through the cavity created by the shrinkage of the active material at the formation.

In accordance with another feature of the invention, the bottom bar is warmed sufficient'y before being placed over the filled tubes of the plate to expand so that the lead spines readily fit into the central recesses of the stubs and the assembly can be effected without difficulty. When the bar cools, it shrinks again and the stubs will tightly enclose the spines to constitute a superior connection.

If the bottom bar is made of plastic, such as polyethylene, polypropylene or an epoxy resin it may be heated to a temperature of about 30° C. to about 50° C., preferably to 40° C.

Figure 2:
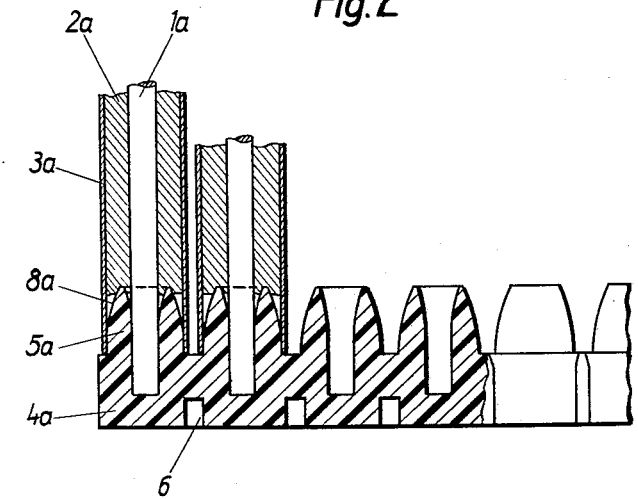

The above and other objects, features, and advantages of the invention will be more fully explained in the following detailed description of a preferred embodiment thereof, taken in conjunction with the accompanying drawings wherein:

FIG. 1 shows a vertical section of a part of a positive lead-acid battery plate according to the present invention immediately after assembly, said stubs showing the novel stubs on the bottom bar; and FIG. 2 shows the plate of FIG. 1 after formation of the active material.

Conventional plates consist of the lead spine which makes a pressed fit with a recess defined in the bottom bar between annular stubs whose rims are beveled. The slotted or porous tubes are fit over the stubs and contain the active material.

Such plates are assembled by first filling the tubes with active material, the tubes with their integral top bar being placed upside down on a shaking machine to shake the active material into the tubes. Afterwards, the bottom bar is pressed over the tubes, making a pressed fit with the tube ends and the spines. The stubs extend into the active material and somewhat compress the same with the material filling the recess defined by the beveled rims of said stubs.

After the assembled plate has been immersed in sulfuric acid, the resultant formation of the active material causes the column of active material to shrink and to form a cavity between the top of the generally cylindrical stub and the bottom of the active material column, this cavity laying bare a certain length of the lead spine. This portion of the lead spine is subjected to corrosion by the sulfric acid which has free access thereto through the slots or pores of the tube. This corroding effect is particularly great during operation of the battery.

FIGS. 1 and 2 show positive battery plates according to the present invention with tubes $3a$ containing active material $2a$ and spines $1a$. The open ends of the tubes are closed by a bottom bar $4a$. The novel bottom bar stubs $5a$ have a generally conical cross section and a height which is sufficient (as shown in FIG. 2) to extend through the cavity $8a$ created by the shrinkage of active material $2a$ after formation.

Except for the shape of the bottom bar stubs connected to the vertical tubes and spines, the structure and materials of the acid storage battery may be entirely conventional, as described, for instance, in "Storage Batteries" by George Wood Vinal, John Wiley & Sons, New York, Fourth Edition. Thus, the spines and top bar may be cast of lead or a suitable lead alloy. The active material may consist of litharge or red lead, or mixtures thereof, as well as other suitable lead oxides, all well known in the lead-acid battery art. The electrolyte will usually consist of a sulfuric acid sloution of suitable concentration.

When immersed in a sulfuric acid electrolyte, the average active material will shrink about 0.5% to 2.5%, by volume, which, in the average positive plate tube, will mean a shrinkage of from about 2.5 mm. to 7.5 mm. Therefore, the annular stubs $5a$ will have an average height slightly exceeding 3 mm. to 8 mm. The exact height may always be readily determined by ascertaining the amount of shrinkage of the active material in the tube and then giving the stubs a slightly longer extension, as shown in FIG. 2.

As appears from the latter figure, the stubs will protect the lead spine from contact with the electrolyte after formation of the active material. Furthermore, the increased depth of central recess $7a$ will secure a better positioning of the spine and the conical cross section of the stub will make it easier to push the stub into the active material when the bottom bar is pressed onto the filled tubes.

The bottom bar $4a$ is preferably made of plastic, such as polyethylene, polypropylene or an epoxy resin and is injection molded. Bores 6 may be provided therein to prevent shrinkage cavities during the injection molding process.

In the assembly, an added improvement is obtained when the plastic bar is heated to a temperature in the range of about 40° C. before it is placed on the plate tubes. This causes a slight expansion of the bottom bar and its stubs so that the stubs more readily fit over the spines. After cooling, the bar shrinks again and the ends of spines 1a will tightly fit into the shrunken recesses 7a.

Following are some specific examples of positive plates incorporating a bottom bar according to the present invention.

Example 1

A positive plate for a lead-acid battery was produced by casting a lead grid consisting of a top bar of 18.4 cm. length and 19 spines extending perpendicular from the top bar, the spines being spaced 0.97 cm. apart. Finely slotted rubber tubes of 0.95 cm. outer diameter were placed about the spines which had a diameter of 0.3 cm., leaving an annular space of 0.175 cm. thickness between the spines and the tubes. The spines had a length of 31.0 cm. while the tubes were 31.0 cm. long. 52 g. of litharge was shaken into each annular space to fill the space with active material.

After the tubes were filled with the active material, a polyethylene bottom bar with annular stubs of a height of 0.7 cm. was press-fitted over the open ends of the tubes, the cross section of the stubs being conical and of a shape similar to that illustrated in FIG. 3. Before fitting the bottom bar over the plate pencils, it was heated to a temperature of 40° C.

After the bar was cooled and the plate was thus completely assembled, it was immersed in an aqueous sulfuric acid solution of 21% concentration. Examination showed the litharge columns in the plate pencils to have shrunk away from the bottom bar but the tapered ends of the stubs still extended thereinto, shielding the spines from the electrolyte.

Positive plates constructed according to the invention have their lead spines always protected against corrosion by the electrolyte. Furthermore, the conical shape of the stubs creates relatively large spaces between the tubes and the stubs as well as the spines and the stubs whereby active material may be shaken or worked all the way around the ends of the spines, further protecting the spines from the outside. Also, the increased length of the stubs secures the spines more firmly in the bottom bar. Finally, the elongated tapered ends of the stubs make it considerably easier to press them into the active material.

While the invention has been specifically described in connection with certain preferred embodiments, it will be understood that many variations and modifications may occur to the skilled in the art without departing from the spirit and scope of this invention, as defined in the appended claims.

We claim:

1. A positive acid storage battery plate comprising a plurality of pencils consisting of a spine, active material, and an enclosing tube; and a bottom bar having an annular stub fitting into each pencil between the spine and the enclosing tube, each stub having a conical cross section of a height at least equal to the height of a cavity created by shrinkage of the active material at its formation and the stub extending into the shrunken active material.

2. A positive acid storage battery plate comprising a plurality of pencils consisting of a spine, active material, and an enclosing tube; and a molded synthetic resin bottom bar having a row of annular stubs, each stub having a conical cross section of a height at least equal to the height of a cavity created by shrinkage of the active material at its formation and the stub extending into the shrunken active material.

References Cited in the file of this patent
UNITED STATES PATENTS

| 2,806,076 | Yamaura et al. | Sept. 10, 1957 |
| 2,882,330 | Garten | Apr. 14, 1959 |